US007023855B2

(12) United States Patent
Haumont et al.

(10) Patent No.: US 7,023,855 B2

(45) Date of Patent: Apr. 4, 2006

(54) METHOD AND DEVICE FOR PERFORMING A PACKET DATA COMMUNICATION

(75) Inventors: Serge Haumont, Helsinki (FI); Mikko Puuskari, Helsinki (FI); Markku Verkama, Espoo (FI)

(73) Assignee: Nokia Corporation, Espoo (FI)

( * ) Notice: Subject to any disclaimer, the term of this patent is extended or adjusted under 35 U.S.C. 154(b) by 986 days.

(21) Appl. No.: 10/010,756

(22) Filed: Dec. 7, 2001

(65) Prior Publication Data

US 2002/0097709 A1 Jul. 25, 2002

Related U.S. Application Data

(63) Continuation of application No. PCT/EP99/04051, filed on Jun. 11, 1999.

(51) Int. Cl.
*H04L 12/28* (2006.01)
*H04L 12/56* (2006.01)

(52) U.S. Cl. .................. 370/395.1; 370/221; 370/229; 370/230.1; 370/232; 370/328; 455/422.1; 455/432.1; 455/436; 455/456.1; 455/456.3

(58) Field of Classification Search .................... None
See application file for complete search history.

(56) References Cited

U.S. PATENT DOCUMENTS

| | | | | |
|---|---|---|---|---|
| 5,475,689 | A | 12/1995 | Kay et al. | 370/95.3 |
| 6,119,012 | A * | 9/2000 | Amirijoo | 455/456.1 |
| 6,370,385 | B1 * | 4/2002 | Bohm et al. | 455/450 |
| 6,438,370 | B1 * | 8/2002 | Einola et al. | 455/422.1 |
| 6,574,221 | B1 * | 6/2003 | Petersen | 370/395.1 |
| 6,717,928 | B1 * | 4/2004 | Kalliokulju et al. | 370/335 |

FOREIGN PATENT DOCUMENTS

WO 9721313 6/1997

OTHER PUBLICATIONS

Concepts, Services, and Protocols of the New GSM Phase 2+.

General Packet Radio Service, G. Brasche et al, *IEEE Communi-cations Magazine* , Aug. 1997, pp. 94-104.

* cited by examiner

*Primary Examiner*—Wellington Chin
*Assistant Examiner*—Raj K. Jain

(57) ABSTRACT

A communication connection to a second user equipment (UE B) by a first user equipment (UE A) is requested, the request including a specific information element for an identification of UE B, a determination is made (S3) in a database on the basis of the specific information element identifying UE B's location within the communication network, a decision is made (S5, S6) whether UE B is reachable or accepts the communication connection or not, and if the decision is positive, the communication connection is established (S7) between UE A and UE B adapted to perform a packet data communication.

10 Claims, 5 Drawing Sheets

METHOD AND DEVICE FOR PERFORMING A PACKET DATA COMMUNICATION

CROSS-REFERENCE TO RELATED APPLICATION

This application is a continuation of International Application PCT/EP99/04051 having an international filing date of Jun. 11, 1999 and from which priority is claimed under all applicable sections of Title 35 of the United States Code including, but not limited to, Sections 120, 363 and 365(c).

BACKGROUND OF THE INVENTION

1. Field of the Invention

The present invention relates to a method for establishing a packet data communication connection in a communication network between a first user equipment and a second user equipment and also to a corresponding device. In particular, the present invention is directed to a method and a corresponding device in a packet data communication system.

2. Discussion of the Related Art

Recently, the usage of mobile telecommunication systems for transmitting and receiving data besides speech gains increasing importance. A method for performing such a data communication is to form data packets which are transmitted via the communication network. This packet data is used for example in the GPRS system (General Packet Radio Service) in GSM or in a packet data communication in a 3$^{rd}$ generation UMTS (Universal Mobile Telecommunication System).

Subscribers can use said packet data communication, e.g., for visiting the World Wide Web (WWW) or the like. Therefore, it is possible to communicate with a large number of different nodes in the Internet. Furthermore, data exchange between mobile stations or user equipments is also possible by using a packet data communication.

In the case of the above mentioned GPRS systems, a data communication between user equipments such as mobile stations or other terminals requires several additional network elements and procedures. In FIG. 5 a simplified example of such a communication system is shown.

Components of said network besides the respective user equipment UE 1, UE 2 of subscribers are, e.g., base station subsystems (BSS) as a transceiver part for a communication between the network and the user equipment, serving GPRS support nodes (SGSN) controlling at least one respective base station subsystem (i.e., serving a respective subscriber roaming in the corresponding network area) and performing security functions and access control. The serving nodes are further connected to gateway GPRS support nodes (GGSN) which provide interworking with external packet switched networks. Additionally, at least one database such as a home location register (HLR) is provided which includes subscriber specific information used by the corresponding network elements for the communication.

Data packets are tunneled between said serving node and said gateway node by using a GPRS tunneling protocol (GTP) tunnel which is defined by associated packet data protocol (PDP) contexts. Said PDP contexts are information sets including identification information, address information and the like.

A packet data communication is performed by using different path protocols like internet protocol (IP) or some other packet data protocols.

According to the prior art, when a packet data communication for example between two mobile stations is to be performed by using a communication system like GPRS, on the calling side, the data is routed from the calling mobile station UE 1 via the serving node SGSN to the gateway node GGSN. The gateway node on the calling side communicates with the gateway node on the terminated side via a packet data network (PDN) such as the public Internet by using a packet data protocol such as IP. Therefore, corresponding addresses, for example the IP address, of each mobile station has to be known to the system. These addresses are provided by the GPRS. On the terminated side, data is routed from the gateway node GGSN 2 via the serving node SGSN 2 to the called mobile station UE 1. Hence, according to FIG. 5, data flows UE 1 ->BSS 1->SGSN 1->GGSN 1->PDN->GGSN 2->SGSN 2->BSS 2->UE 2 and vice versa, respectively.

However, the above described packet data communication is not optimal for a communication between two user equipments served by the system by using for example IP or the like over an extended period of time. Since such a communication, for example for an IP telephony, an IP video-telephony or surveillance applications, is performed via the public packet data network and therefore via the gateway nodes GGSN, the load for network resources is unnecessarily high. Furthermore, the security level of the connection depends on the security level of the used public network. As the load of some public networks, for example of the Internet, varies in a wide range, a transfer rate and Quality of Service (QoS) could decrease extremely in case of increasing load.

Another drawback of the above described communication method is that the IP address (or other packet data protocol addresses) of the corresponding user equipments must be known beforehand. However, these addresses are usually allocated dynamically, i.e., they are changed.

In the article "Concepts, Services, and Protocols of the New GSM Phase 2+ General Packet Radio Service" by Brasche, G., et al, IEEE Communications Magazine, vol. 35, no. 8, pages 94–104, Aug. 1, 1997, a packet data communication network is described in which a gateway support node GGSN is involved in packet data communications between two mobile stations.

Document WO 97/21313A describes a routing procedure in a packet data communication network using a SGSN and a GGSN. A fixed number is used to address the SGSN currently in use.

SUMMARY OF THE INVENTION

Therefore, it is an object of the present invention to provide a method for establishing a packet data communication connection between user equipments, which is free from the above mentioned drawbacks.

According to the present invention this object is achieved by a method for establishing a packet data communication connection in a communication network between a first user equipment and a second user equipment, said communication network comprising at least two access networks for establishing a data path between the communication network and the respective user equipment, said first user equipment being connected with one of said at least two access networks and said second user equipment being connected with the other one of said access networks, at least two serving nodes for controlling a respective different one of said access networks, and at least one database for storing information used for a communication connection in said communication network and connected with said at least two serving nodes, said method comprising the steps of: requesting a communication connection to the second user equipment by the first user equipment to the respective serving node, such a request including a specific fixed information element for an identification of the second user equipment, determining in said database on the basis of said specific fixed information element identifying the second user equipment a location of said second user equipment within the communication network at the respective other serving node, deciding, whether said second user equipment is reachable or accepts the communication connection or not, and if the decision is positive, establishing the communication connection between the first and the second user equipment via a direct connection between said serving nodes adapted to perform a packet data communication.

Furthermore, the present invention proposes a device for performing a packet data communication in a communication network between a first user equipment and a second user equipment, said communication network comprising at least two access networks for establishing a data path between the communication network and the respective user equipment, said first user equipment being connected with one of said at least two access networks and said second user equipment being connected with the other one of said access networks, at least two serving nodes for controlling a respective different one of said access networks, and at least one database for storing information used for a communication connection in said communication network and connected with said at least two serving nodes, said device comprising detection means for detecting a request for a communication connection to the second user equipment by the first user equipment, such a request including a specific fixed information element for an identification of the second user equipment, requesting/obtaining means for requesting and obtaining a location of said second user equipment within the communication network at the respective other serving node from said database on the basis of said specific fixed information element identifying the second user equipment, connection requesting means for requesting a connection from said second user equipment and for deciding, whether said second user equipment is reachable or accepts the communication connection or not, and connection establishing/canceling means for establishing the communication connection between the first and the second user equipment via a direct connection between said serving nodes adapted to perform a packet data communication.

Advantageous further developments of the present invention are as set out in the respective dependent claims.

According to the present invention, the proposed method and/or device save network resources by bypassing the gateway nodes for a packet data communication between two user equipments. Therefore, the load of the system is reduced. Furthermore, the security level of the communication connection can be defined by the subscriber or a network operator. Additionally, the quality of service (QoS) is independent from the load of public networks and can also be defined by the operator. Moreover, as an identification information, fixed addresses like an E.164 address can be used instead of, e.g., a packet data network address dynamically allocated, which further reduces the load of the system and results in a simplified signaling procedure.

Preferred embodiments of the invention are described herein below in detail by way of example with reference to the accompanying drawings.

DESCRIPTION OF THE PREFERRED EMBODIMENTS

Figure 1:
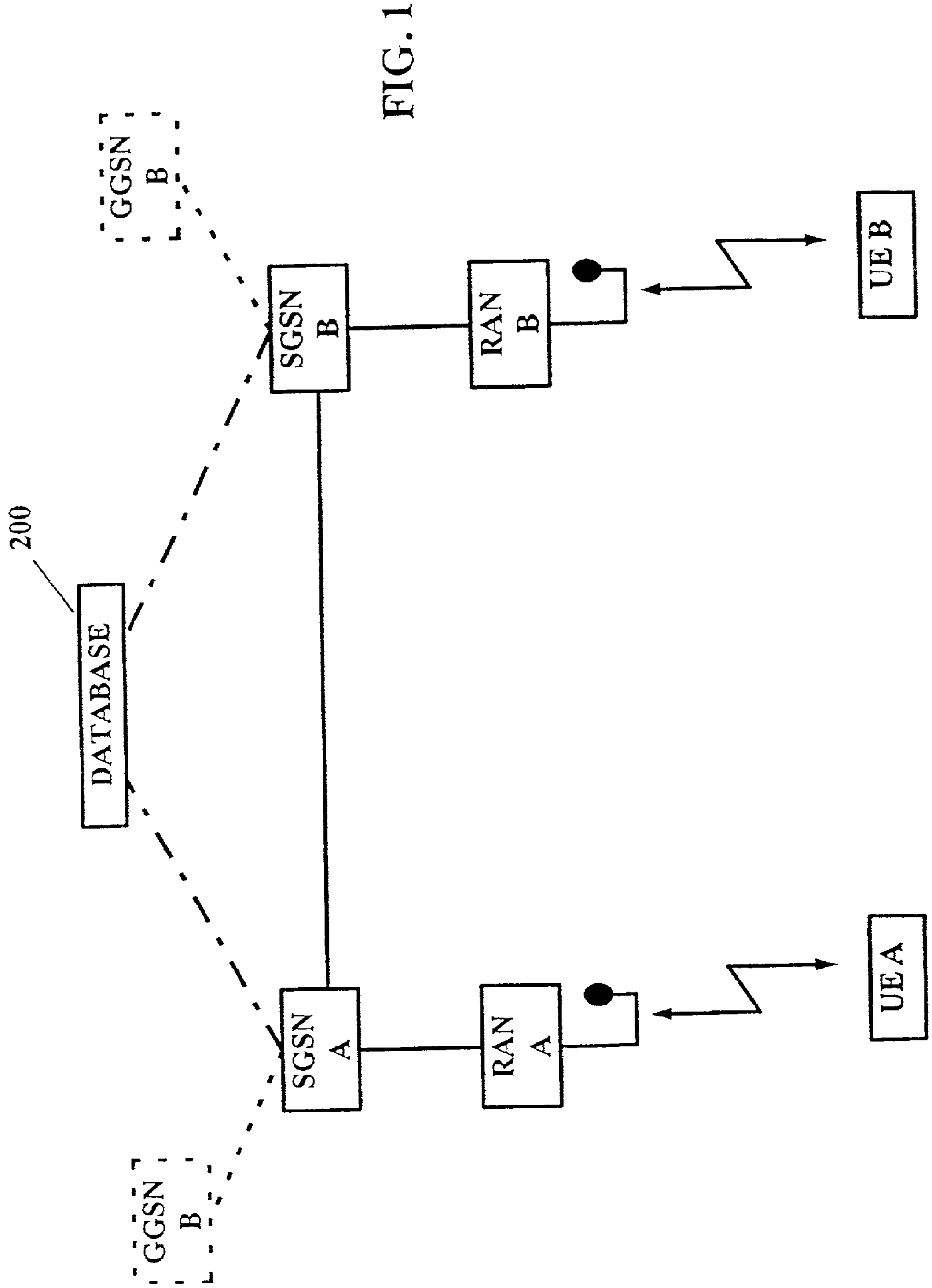
FIG. 1 is a block diagram illustrating the structure of a communication network establishing a communication connection according to the invention.

FIG. 1 is a diagram illustrating the structure of a communication network in which a communication connection according to the present invention is established. Here, a packet data part of a $3^{rd}$ generation UMTS is shown. Anyway, the present invention is also applicable in a GPRS system or other packet data systems.

In FIG. 1, a communication connection between a first user equipment UE A and a second user equipment UE B for e.g. a packet data communication is to be established. In this case, the first user equipment UE A is within a first radio access network RAN A, while the second user equipment UE B is within a second radio access network RAN B. Said radio access networks comprise transceivers (not shown) and access network controllers (not shown) for transmitting and receiving data to and from the corresponding user equipment, respectively.

Each of the radio access networks RAN A, RAN B is controlled by a respective serving node SGSN A, SGSN B (referred to as 3G-SGSN in UMTS). Said serving nodes monitor the presence of a user equipment within its serving area. Additionally, they transmit data to and from the user equipment, respectively. The serving nodes SGSN A, SGSN B are connected to a database 200, for example to a home location register (HLR), in which subscriber specific and network specific information like location information are stored for a further processing.

The communication connection according to the present invention is based on a direct connection between the two serving nodes SGSN A, SGSN B. Said connection is for example a GTP tunnel.

In another case, the two user equipments are within the same SGSN serving area, for example in one radio access network area. In this case, no communication connection by a GTP tunnel is required, as only one serving node is involved. Here, the corresponding serving node SGSN controls the packet data communication between the first and the second user equipment UE A, UE B.

Figure 2:
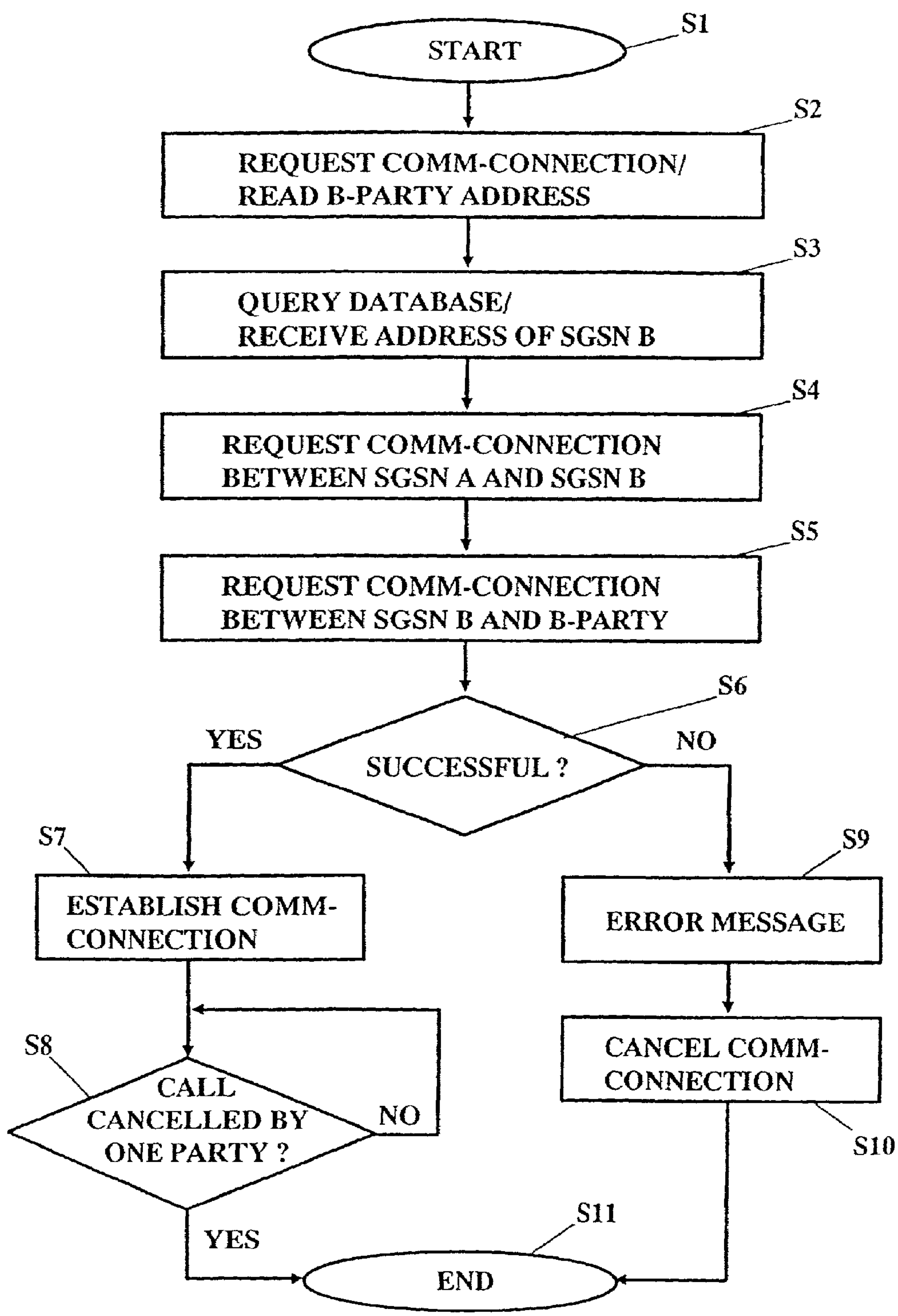
FIG. 2 is a flowchart illustrating a method for establishing and maintaining the communication connection according to the invention.

In the following, a flowchart illustrating a method for establishing and maintaining the packet data communication connection according to the invention is described with reference to FIG. 2.

In the method according to the invention, in step S1, a packet data communication connection is initiated by the first user equipment UE A. Therefore, in step S2, a request for establishing a communication connection to the second user equipment UE B is forwarded to the first serving node SGSN A via a data path. Said request includes a specific information element for an identification of the second user equipment UE B, for example its E.164 address, which is associated, e.g., to a new PDP context activation, which is described below. In contrast to the prior art, where a dynamically allocated packet data network address is used, said specific information element is a fixed address. The serving node SGSN A reads said "new" address out of the new PDP context sent from the first user equipment UE A.

In step S3, on basis of said specific information element, the first serving node SGSN A requests the database 200 for the location of the second user equipment UE B within the communication network. From the database 200, the "new" address is checked and the location of the called user equipment UE B (i.e., the corresponding radio access network, for example RAN B, and the corresponding serving node, for example SGSN B) is obtained. Then, the requesting serving node SGSN A is informed about the obtained result, i.e., about the location of the second user equipment UE B. When it is known by the database 200, that the second user equipment UE B is not registered in any serving node area or it is not allowed to receive a call (call barring), the database will return an error message to the requesting serving node SGSN A. In this case, the call will be terminated and/or other specific actions will be performed, for example forwarding a voice mail. This will be described later with reference to steps S9 to S11 .

Moreover, when sending information from the database to the requesting serving node SGSN A (address of SGSN B, error message), it is possible to include additional information related to call handling. This information indicates which action is to be performed in the corresponding case (e.g., UE B reachable or not), for example intelligent network related instructions, call related supplementary services or the like.

In step S4, on basis of said obtained result, for example, the corresponding second serving node SGSN B is contacted by the first serving node SGSN A via a (direct) connection. Then, the second serving node SGSN B tries to contact the called second user equipment UE B via the corresponding radio access network RAN B in step S5.

However, it is also possible, that the second serving node SGSN B already knows, that the second user equipment is not reachable (for example because of a calling timer has expired), not allowed to be reached (call barring) or the like. In such a case, the SGSN B directly returns an error message to the calling serving node SGSN A without trying to contact the second user equipment UE B (i.e., step S5 is omitted). Similarly to the above described, additional information associated to the error message can be sent, such as voice mail information or the like. That information can be used by the first serving node SGSN A for performing further action.

In step S6, it is decided, whether said second user equipment UE B is reachable or not, e.g., attached to or detached from the network.

If the decision in step S6 is positive, i.e., the user equipment UE B is reachable, in step S7 the communication connection between the first and the second user equipment UE A, UE B is created for performing a packet data communication by using a specific communication protocol. The creation of the packet data communication connection comprises the establishment of all PDP contexts and the existence of selected GTP tunnels between the two serving nodes SGSN A, SGSN B. A first implementation is to establish at first only a context to carry signaling connection (e.g., Q.931 used by VoIP (voice over internet protocol) or ISDN (integrated services digital network)). A second approach is to immediately allocate all the PDP contexts needed for the connection. Note that a multimedia connection may have in fact multiple connections (audio, video, control) which could be mapped to different PDP contexts (or PDP context subflows).

In step S8, it is checked, whether the packet data communication connection is terminated by either one of the first and second user equipment UE A, UE B. This takes place for example if one side deactivates the context. If no termination is detected, the loop in step 8 is repeated. If a termination is detected, the call is finished in step S11.

If the decision in step S6 is negative, i.e., the user equipment UE B is not reachable or rejects the activation, an error message including an appropriate value indicating this situation is forwarded from the second serving node SGSN B via the first serving node SGSN A to the first user equipment UE A in step S9. As described above, such an error message can also be sent by the database 200. Also other error situation, for example during the communication, such as a connection interruption are indicated.

Moreover, it is possible to combine additional information with the error message concerning further action such as forwarding a voice mail or the like. In such a case, in a preferred implementation, the first serving node SGSN A may perform said further action. The information concerning said further action may come from the second serving node SGSN B, i.e., the SGSN B sends call handling information to SGSN A and may store subscriber data of the second user equipment UE B. It is also possible, that the database 200 sends the information, as described above. In case, that the second user equipment UE B for example rejects the call (PDP context activation), said user equipment may also send a reject (error) message including information concerning further action (voice mail or the like).

In step S10, the data path is canceled by deactivation of the PDP context and the call is terminated in step S11.

Figure 3:
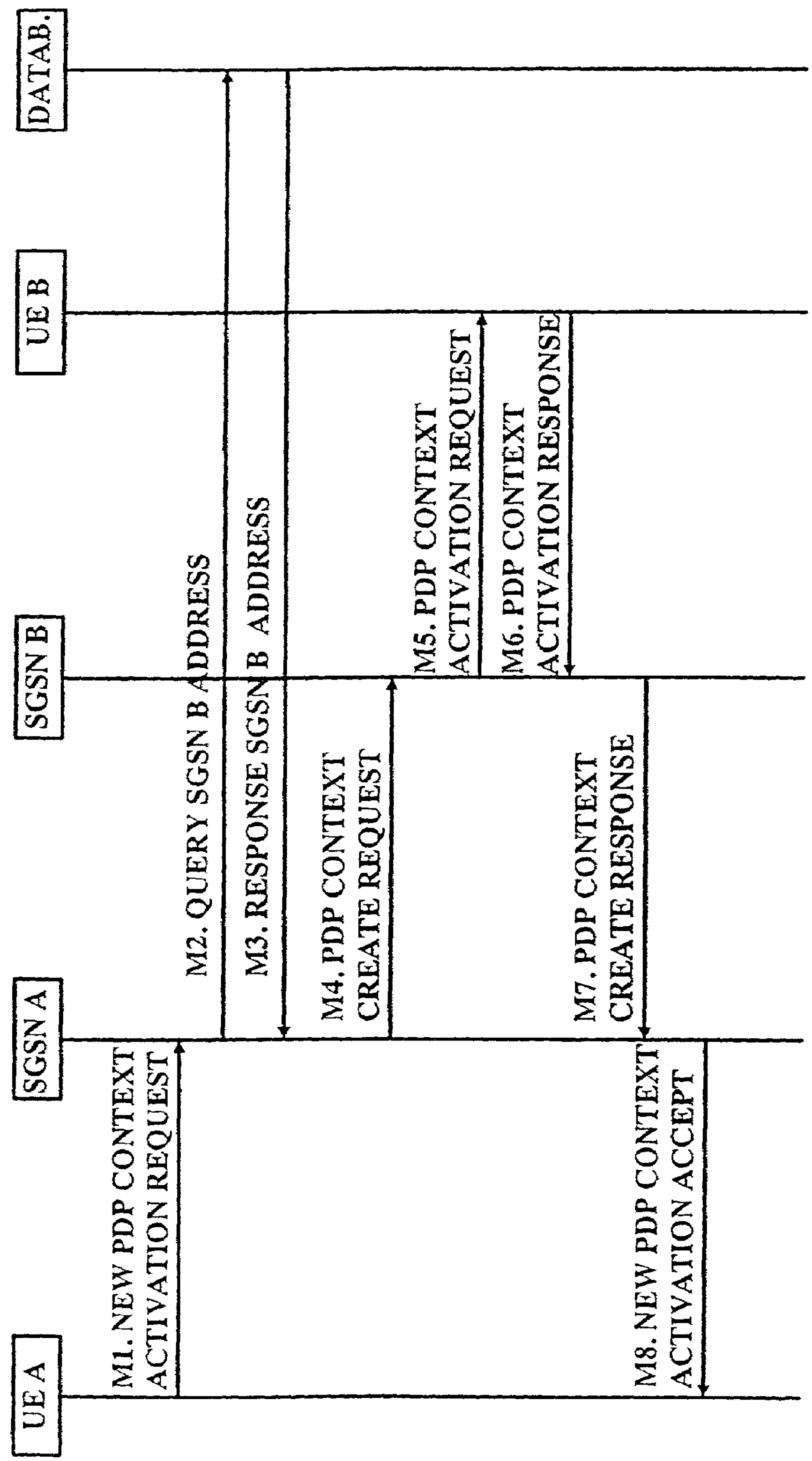
FIG. 3 is a diagram illustrating messages exchanged between network elements in FIG. 1.

In FIG. 3, a diagram is shown by which corresponding messages between different network elements according to FIG. 1 for establishing the above described communication connection are illustrated. To simplify matters, radio access networks as transmitting network elements are omitted for this explanation. Nevertheless, corresponding signaling is still involved.

As mentioned above, the packet data communication according to the invention is initiated by the first user equipment UE A via a new PDP context activation request M1 to the first serving node SGSN A as a call request message. Instead of a conventionally used packet data address, as mentioned above, said new PDP context activation request M1 includes besides information such as quality of service, configuration information and the like in particular a specific information element referring to the called user equipment UE B, for example an E.164 address of said called user equipment.

After checking the new PDP context activation request, based on said specific information element (e.g., E.164 address) read out of said new PDP context, the serving node SGSN A queries from the database 200 for the location or the address of the second user equipment UE B, i.e., for the corresponding serving node SGSN B (message M2). In message M3, the database responds to the query with respective information.

Then, in a message M4, a PDP context create request is sent from the first serving node SGSN A via a connection to the second serving node SGSN B to request an establishment of a packet data communication connection. After receiving said message M4, the second serving node SGSN B requests a PDP context activation at the second user equipment UE B (message M5).

If the second user equipment UE B is reachable, it sends a PDP context activation response message M6 back to the SGSN B to indicate a successful communication connection establishment. If the second user equipment UE B is not reachable for example due to being detached from the network, this situation is recognized by the SGSN B.

In a message M7, the second serving node SGSN B sends a PDP context create response to the first serving node SGSN A. By this message it is indicated whether the communication connection establishment to the second user equipment was successful or not. If it was successful, a new PDP context activation accept message M8 is sent to the first user equipment UE A. On the other hand, if the connection is not successful, an error message (not shown) with an appropriate value is sent to the SGSN A and the UE A.

It is to be noted, that the packet data communication can start when all contexts are established and a GTP tunnel between the to serving nodes exists.

Referring to the messages described above, in one application of the present invention it is possible that the messages M1, M4, M5 and M6 contain all required information to allow the second user equipment UE B to recreate a call control message. An implementation is for example to carry the complete call request message inside a protocol configuration option field of the PDP context activation message M1. The advantage is that a call establishment time is reduced and the second user equipment UE B is provided with all required information to decide whether to accept or to reject the call. Similarly, the messages M6, M7 and M8 may contain a corresponding call accept message for a corresponding handling by the first user equipment UE A.

It is to be noted that the call control (CC) may be in accordance with a Q.921 protocol or any other known or future multimedia CC protocol.

On the other hand, in another application, the PDP context activation may contain only the activation of context well suited for signaling but no information as described above. Thereafter, the user equipments will exchange call control messages (not shown) to decide on the establishment of the connection (e.g., video, audio, throughput or the like and the corresponding encoding and decoding procedures). When the decision is made, that the call is established, the PDP context activation according to the invention will be repeated and used to establish bearers (for example a real time bearer). Said bearers are used for the communication connection based on a negotiation made by the exchanged call control messages mentioned above.

It is to be noted, that in both cases described above the PDP context activation according to the invention allows a negotiation between the first user equipment UE A and the second user equipment UE B about characteristics of the communication connection, such as a quality of service profile. This is particularly useful in an implementation for example in a multimedia call, where the second user equipment UE B may accept a voice connection and reject a video connection. In such a case, corresponding parameters for the communication connection can be modified.

Figure 4:
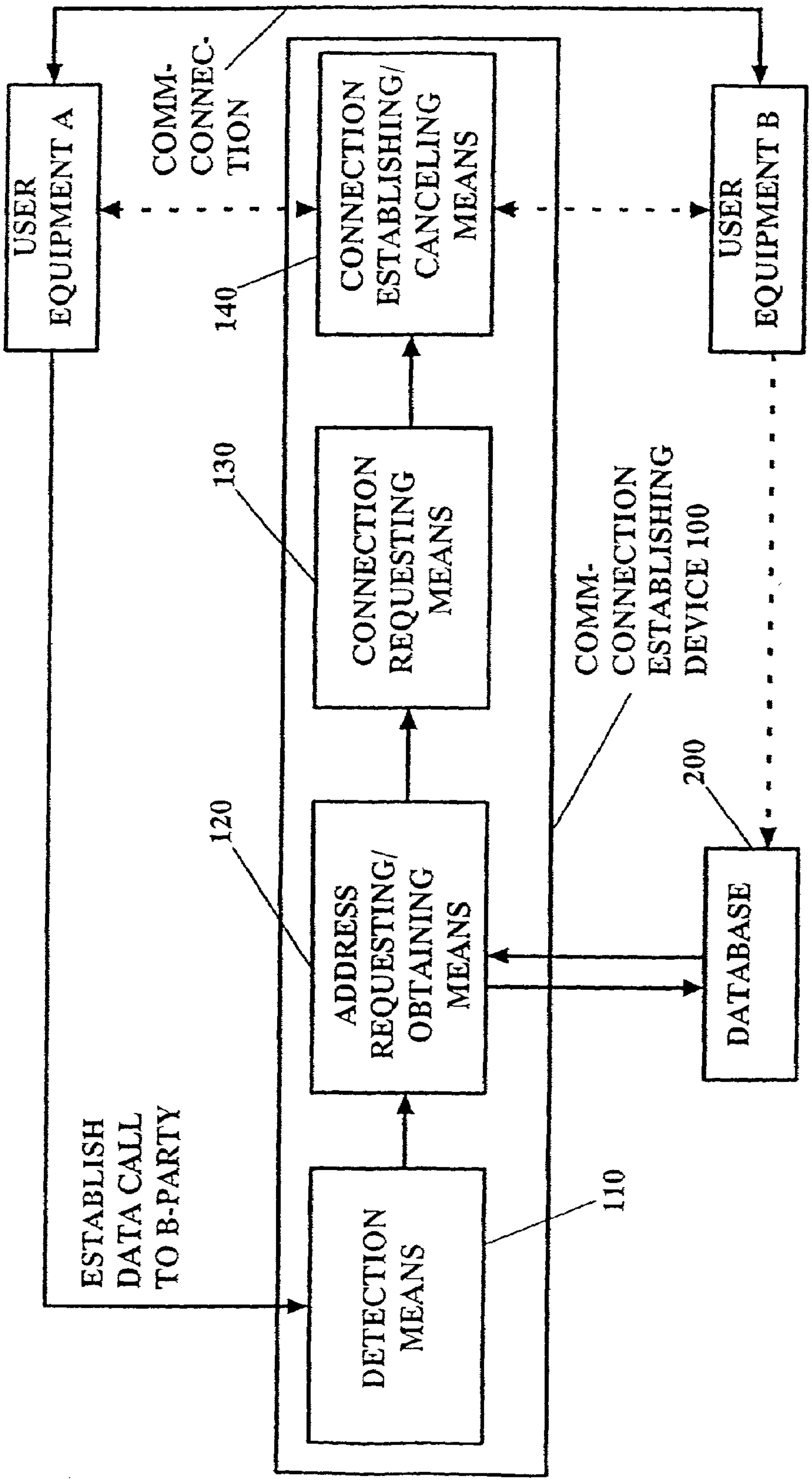
FIG. 4 is a block circuit diagram illustrating a device for establishing and maintaining the communication connection according to the invention.
Figure 5:
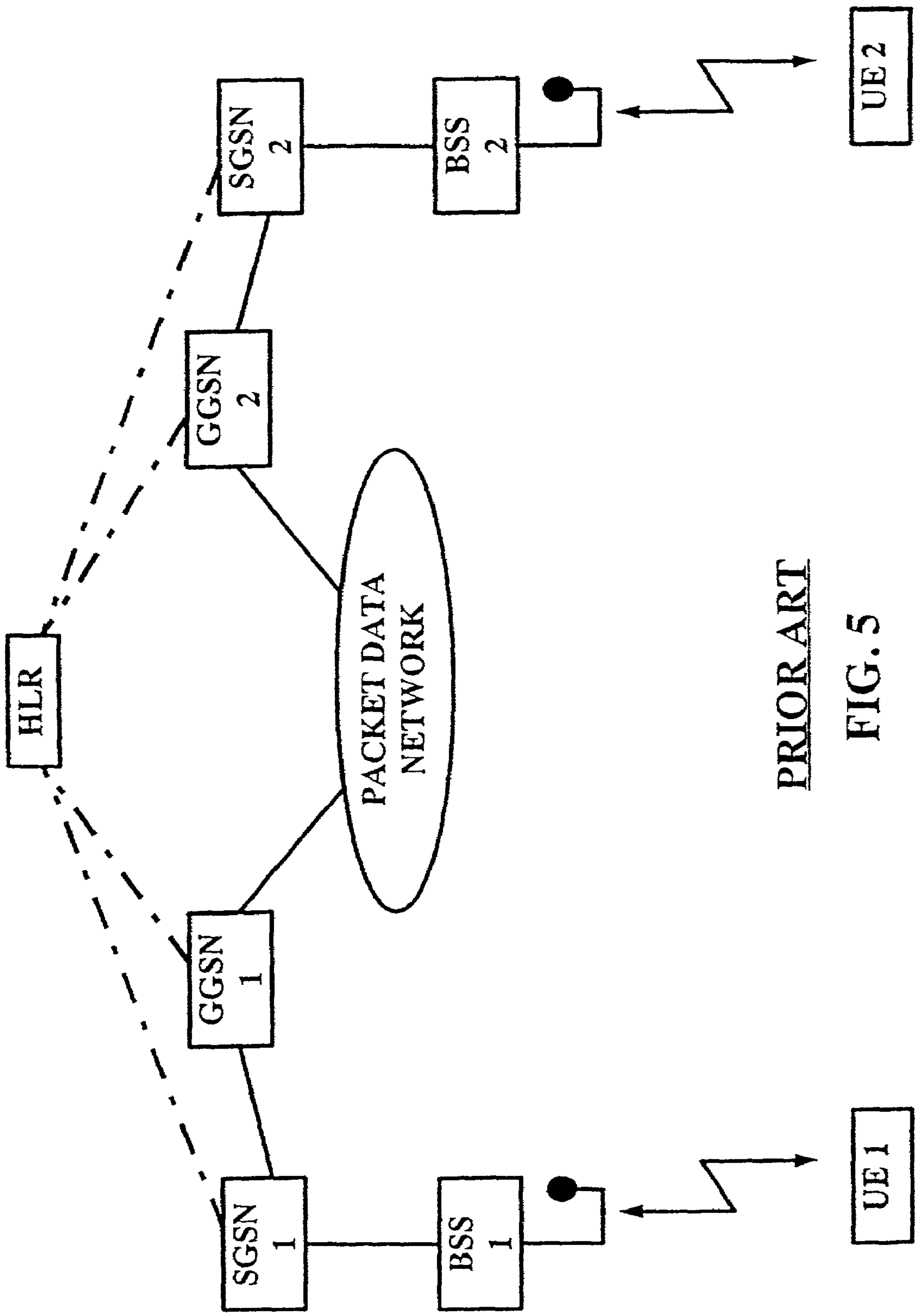
FIG. 5 is a block diagram illustrating the structure of a communication network establishing a conventional communication connection.

In the following, a block circuit diagram illustrating a device for establishing and maintaining the communication connection according to the invention is described with reference to FIG. 4.

The establishing device 100 comprises a detection means 110 for detecting a request for a communication connection to the second user equipment UE B by the first user equipment UE A. Such a request includes a specific information element for an identification of the second user equipment UE B, for example an E.164 address thereof, which is associated e.g., to a new PDP context activation, which is described above.

Reference numeral 120 denotes a requesting/obtaining means for requesting and obtaining the location of the called user equipment UE B (i.e., the corresponding radio access network, for example RAN B, and the corresponding serving node, for example SGSN B) within the communication network from the database 200 on the basis of said specific information element of the second user equipment UE B.

A connection requesting means 130 requests a communication connection between the first and second user equipment UE A, UE B via the corresponding network elements (e.g., SGSN A, SGSN B). Additionally, it is checked, whether said second user equipment UE B is reachable or not.

A connection establishing/canceling means 140 is adapted to establish the communication connection between the first and the second user equipment UE A, UE B for performing a packet data communication by using a specific communication protocol such as IP. It is also used to cancel the packet data communication connection when either the first user equipment UE A or the second user equipment UE B terminates the call for example by deactivation of the PDP context. Additionally, if the connection requesting means 130 indicates, that no connection is possible, the connection establishing/canceling means 140 is adapted to forward an error message including an appropriate value indicating this situation to the first user equipment UE A. Thereafter, the data path is cancelled and the communication is finished.

In the above there is described particularly a case, where the first and the second user equipment UE A, UE B are in a respective first and second serving node area SGSN A, SGSN B. However, it is also possible, as mentioned above, that the user equipments are within the same SGSN area. In this case, which is a special case of the above described, the packet data communication is performed via the single serving node, without establishing a GTP tunnel.

It is to be noted, that the packet data communication connection according to the present invention is maintained also in case of a handover. Such a handover occurs for example due to a movement of at least one of the user equipments to another radio access network area or due to other conditions such as signal strength. Therefore, it is obvious, that even in the case, that one user equipment originally in the same serving node area as the other user equipment is moved in another serving node area, and vice versa, the communication connection is maintained.

As the above described packet data communication is initiated by the first user equipment UE A, it is easy to understand that a corresponding subscriber A is preferably charged for all traffic by all used serving nodes (SGSN A, SGSN B). However, it is also possible, that each subscriber (i.e., user equipment UE A, UE B) is charged separately by the respective serving node. This could be subscriber and/or network specific.

As described above, the present invention allows to perform a packet data communication by using a packet data protocol such as IP between two user equipments via a communication network without involving gateway nodes, thereby bypassing for example the public internet. This is in particular attractive for a communication over a long period of time, such as IP telephony or IP videotelephony. Additionally, other fields of application are possible, for example a wireless remote sensing application or a wireless surveillance application. In this cases, a user equipment communicates with another fixed or movable station permanently, periodically or on demand, but preferably with a high data rate and over a long period of time. By using the present invention, this communication connection is independent from quality, security level and load of a public packet data communication network.

The present invention proposes a method for establishing a packet data communication connection in a communication network between a first user equipment UE A and a second user equipment UE B, said communication network comprising at least one access network RAN A, RAN B for establishing a data path between the communication network and the respective user equipment, at least one serving node SGSN A, SGSN B for controlling a respective access network, and at least one database 200 for storing information used for a communication connection in said communication connection, said method comprising the steps of requesting S2 a communication connection to the second user equipment by the first user equipment, such a request including a specific information element for an identification of the second user equipment, determining S3 in said database on the basis of said specific information element identifying the second user equipment a location of said second user equipment within the communication network, deciding S5, S6, whether said second user equipment is reachable or accepts the communication connection or not, and if the decision is positive, establishing S7 the communication connection between the first and the second user equipment adapted to perform a packet data communication. The present invention proposes also a corresponding device.

It should be understood that the above description and accompanying figures are merely intended to illustrate the present invention by way of example only. The preferred embodiments of the present invention may thus vary within the scope of the attached claims.

What is claimed is:

1. A method for establishing a packet data communication connection in a communication network between a first user equipment and a second user equipment, said communication network comprising at least two access networks for establishing a data path between the communication network and the respective user equipment, said first user equipment being connected with one of said at least two access networks and said second user equipment being connected with the other one of said access networks, at least two serving GPRS support nodes for controlling a respective different one of said access networks, and at least one database for storing information used for a communication connection in said communication network and connected with said at least two serving nodes, said method comprising the steps of:

requesting a communication connection to the second user equipment by the first user equipment to the respective serving GPRS support node, such a request including a specific fixed information element for an identification of the second user equipment, determining in said database on the basis of said specific fixed information element identifying the second user equipment a location of said second user equipment within the communication network at the respective other serving GPRS support node, deciding, whether said second user equipment is reachable or accepts the communication connection or not, and if the decision is positive, establishing the communication connection between the first and the second user equipment via a direct connection between said serving GPRS support nodes adapted to perform a packet data communication.

2. A method according to claim 1, further comprising the step of canceling the packet data communication connection when either the first user equipment or the second user equipment deactivates the connection.

3. A method according to claim 1, further comprising the steps of, if the decision in the deciding step is negative, indicating an error message including an appropriate value to the first user equipment, and canceling the data path.

4. A method according to claim 1, wherein said specific fixed information element used for the identification of said second user equipment is an E.164 address of said second user equipment.

5. A method according to claim 1, wherein the communication connection established in said establishing step is routed via another network element if a handover is performed for at least one of the user equipments.

6. A device for performing a packet data communication in a communication network between a first user equipment and a second user equipment, said communication network comprising at least two access networks for establishing a data path between the communication network and the respective user equipment, said first user equipment being connected with one of said at least two access networks and said second user equipment being connected with the other one of said access networks, at least two serving GPRS support nodes for controlling a respective different one of said access networks, and at least one database for storing information used for a communication connection in said communication network and connected with said at least two serving nodes, said device comprising detection means for detecting a request for a communication connection to the second user equipment by the first user equipment, such a request including a specific fixed information element for an identification of the second user equipment, requesting/obtaining means for requesting and obtaining a location of said second user equipment within the communication network at the respective other serving GPRS support node from said database on the basis of said specific fixed information element identifying the second user equipment, connection requesting means for requesting a connection from said second user equipment and for deciding, whether said second user equipment is reachable or accepts the communication connection or not, and connection establishing/canceling means for establishing the communication connection between the first and the second user equipment via a direct connection between said serving GPRS support nodes adapted to perform a packet data communication.

7. A device according to claim 6, wherein said connection establishing/canceling means is adapted to cancel the packet data communication connection when either the first user equipment or the second user equipment deactivates the connection.

8. A device according to claim 6, wherein, if the decision by said connection requesting means is negative, said connection establishing/canceling means is adapted to indicate an error message including an appropriate value to the first user equipment, and cancel the data path.

9. A device according to claim 6, wherein said specific fixed information element used for the identification of the second user equipment is an E.164 address of said second user equipment.

10. A device according to claim 6, wherein the communication connection established by said connection establishing/canceling means is routed via another network element if a handover is performed for at least one of the user equipments.

* * * * *